United States Patent [19]

Hummel

[11] Patent Number: 5,636,885

[45] Date of Patent: Jun. 10, 1997

[54] COMBINATION AUTOMOBILE GRILL GUARD AND TOW HITCH

[76] Inventor: Jakie Hummel, R.R. 1, Box 4, Mott, N. Dak. 58646

[21] Appl. No.: 648,730

[22] Filed: May 16, 1996

[51] Int. Cl.$^6$ ................................................ B60R 19/52
[52] U.S. Cl. .......................... 293/115; 293/117; 280/479.2
[58] Field of Search ................................ 293/102, 115, 293/117, 118, 116; 280/479.2, 491.1, 491.2, 491.3, 498, 505

[56] References Cited

U.S. PATENT DOCUMENTS

| 2,699,964 | 1/1955 | Hartung | 293/115 |
|---|---|---|---|
| 2,880,016 | 3/1959 | Peterson | 293/117 X |
| 3,281,162 | 10/1966 | Carson | 280/491.3 X |
| 3,287,027 | 11/1966 | Schuckman | 293/115 X |
| 3,384,391 | 5/1968 | Batke | 280/491.3 X |
| 5,067,760 | 11/1991 | Moore et al. | 293/115 |

FOREIGN PATENT DOCUMENTS

| 435430 | 6/1947 | Italy | 293/115 |
|---|---|---|---|

*Primary Examiner*—Dennis H. Pedder

[57] ABSTRACT

A combination automobile grill guard and tow hitch adapted to be coupled to the end of a motor vehicle, the apparatus comprising: a frame having a central segment formed as a tow hitch and two side segments, each side segment being formed in a planar generally rectangular configuration and including a generally rectangular shaped support shaft, each support shaft including a rearwardly and inwardly extending mounting bracket to permit coupling to a vehicle, each side segment including a locking device affixed thereto; and the central segment of the frame being formed as a tow hitch having a planar upper region and at least two downwardly extending legs, a lower extent of each leg being rotatably coupled to the support brackets of the frame, the upper extent of the tow hitch having a locking assembly to permit coupling with various types of hitch devices, the tow hitch being positioned in a locked vertical orientation with the apparatus being utilized as a brush guard, the tow hitch being positioned in a horizontal orientation when utilizing the apparatus as a towing device.

1 Claim, 4 Drawing Sheets

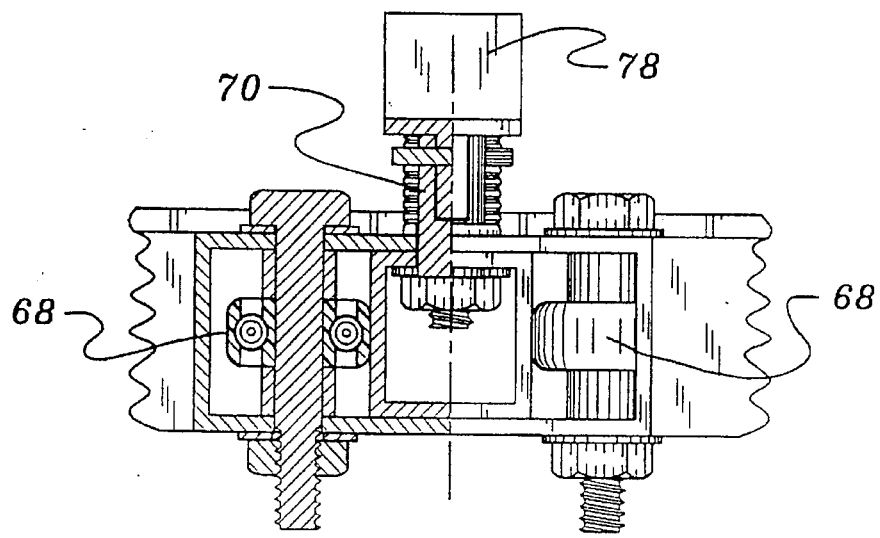
FIG. 5
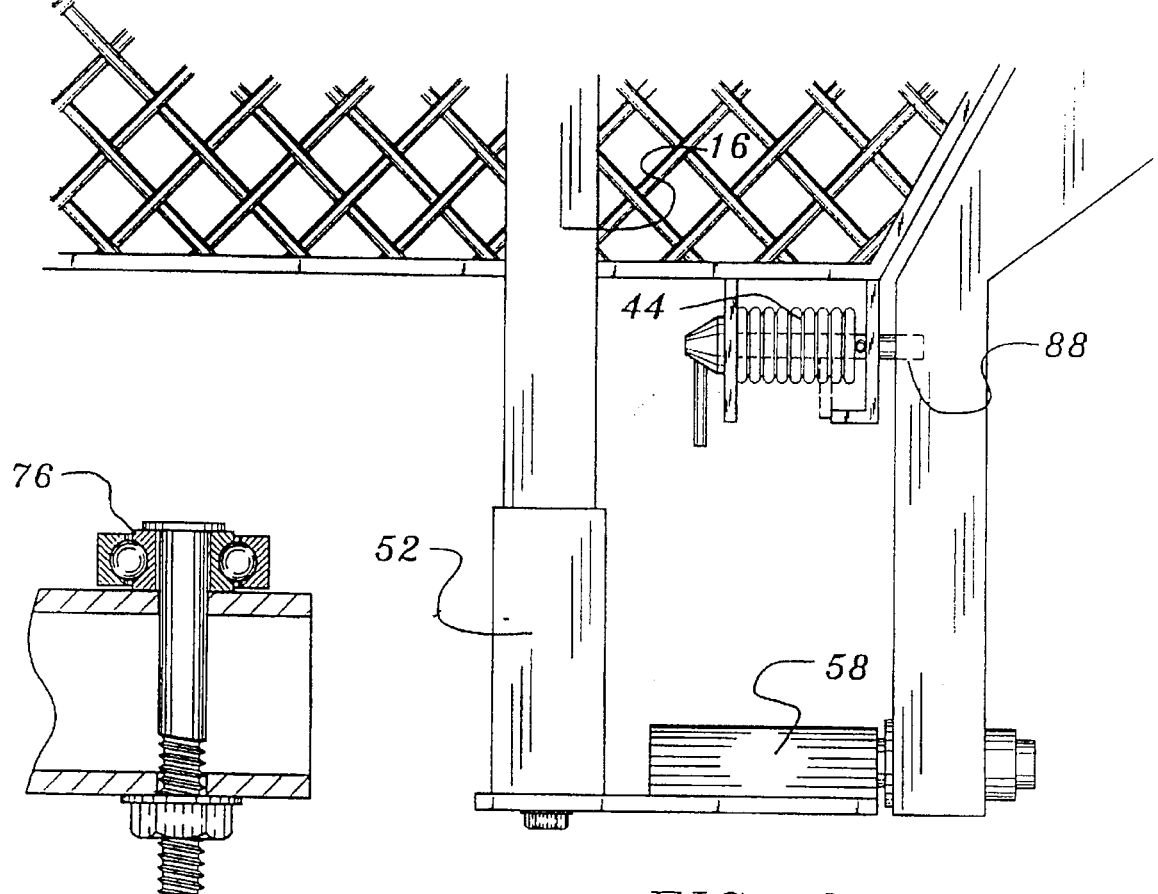
FIG. 6
FIG. 7

COMBINATION AUTOMOBILE GRILL GUARD AND TOW HITCH

BACKGROUND OF THE INVENTION

1. Field of the Invention

The present invention relates to a combination automobile grill guard and tow hitch and more particularly pertains to mounting the apparatus upon the front end of a vehicle for utilization as both a protective device and towing means.

2. Description of the Prior Art

The use of vehicle grill guards is known in the prior art. More specifically, vehicle grill guards heretofore devised and utilized for the purpose of protecting vehicles from various obstructions are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,067,760 to Moore a platform/grill cover unit for use on a land vehicle.

U.S. Pat. No. 4,645,250 to Bauer discloses a bumper-radiator grill assembly.

U.S. Pat. No. 4,168,855 to Koch discloses a vehicle protection bumper assembly.

Lastly, U.S. Pat. No. 4,099,760 to Mascotte discloses a grill and brush guard and utility rack for a vehicle.

In this respect, the combination automobile grill guard and tow hitch according to the present invention substantially departs from the conventional concepts and designs of the prior art, and in doing so provides an apparatus primarily developed for the purpose of mounting the apparatus upon the front end of a vehicle for utilization as both a protective device and towing means.

Therefore, it can be appreciated that there exists a continuing need for a new and improved combination automobile grill guard and tow hitch which can be used for mounting the apparatus upon the front end of a vehicle for utilization as both a protective device and towing means. In this regard, the present invention substantially fulfills this need.

SUMMARY OF THE INVENTION

In view of the foregoing disadvantages inherent in the known types of vehicle grill guards now present in the prior art, the present invention provides an improved combination automobile grill guard and tow hitch. As such, the general purpose of the present invention, which will be described subsequently in greater detail, is to provide a new and improved combination automobile grill guard and tow hitch and method which has all the advantages of the prior art and none of the disadvantages.

To attain this, the present invention essentially comprises a new and improved combination automobile grill guard and tow hitch adapted to be coupled to the front end of a motor vehicle, the apparatus comprising, in combination: a frame having a central segment formed as a tow hitch and two side segments, each side segment having an upper region, a lower region, a front face and a rear face, each side segment having a rigid periphery with a mesh interior, each side segment having an outer end including a generally trapezoidal shaped headlight guard with a hollow interior, each side segment having an inner end angled outwardly from top to bottom, each side segment including a horizontally extending spring-loaded pin member, each side segment including a vertically positioned support shaft formed in a generally rectangular configuration, each support shaft having a lower region extending beneath each side segment, two generally L-shaped horizontal mounting brackets each including a vertical receiving post with a hollow interior, each receiving post adapted to receive the lowermost extent of a support shaft, a ¾ inch cap screw being positioned through the receiving post, a long portion of each mounting bracket extending rearwardly and including bolts extending therethrough to permit coupling beneath the front end of a vehicle, a short segment extending from each support shaft toward the central segment of the apparatus, each short segment including a generally semi-cylindrical bearing member affixed thereupon; the central segment of the frame being formed as a tow hitch, the tow hitch having a front face, a rear face and an essentially hollow interior, the tow hitch having an upper region formed in a planar generally triangular configuration, an upper extent of the upper region including two opposed rotatable bearing members positioned therein, the rear surface of the tow hitch including a hole positioned therethrough, the approximate center point of the lower extent of the tow hitch including a semicircular notch; a central draw bar formed in an elongated rectangular configuration and positioned through the tow hitch between the bearing members, the draw bar having a first end including a generally U-shaped member pivotally coupled thereto by a pivot pin, the U-shaped member being couplable to various types of hitch means, the draw bar having a central extent including at least one aperture, the draw bar having a second end including a bearing fastened thereto by a bolt, the rear surface of the tow hitch including a bracket, a handle being pivotally coupled to the bracket by a pivot pin, the handle having a rear section with a spring mounted thereto and coupled to the rear surface of the tow hitch, the front end of the handle including an engagement cylinder, in an operative orientation the tow hitch being positioned horizontally with the first end of the draw bar extending distally with respect to the frame, in a fully extending orientation the bearing of the second end engaging the notch of the tow hitch, in an operative orientation the engagement cylinder being positionable through the hole in the rear surface of the tow hitch and within an aperture of the draw bar to lock the draw bar in place; and the upper region of the tow hitch having a lower extent with two end corners, a rectangular shaped side leg extending vertically from each end corner, the lower extent of each side leg including a sidewardly projecting rod adapted to be coupled within a bearing member, the upper extent of each side leg including holes to permit receipt of a spring-loaded pin, the tow hitch being positioned in a locked vertical orientation with the apparatus being utilized as a brush guard, the tow hitch being pivoted into a horizontal orientation when utilizing the apparatus as a towing device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination automobile grill guard and tow hitch which has all of the advantages of the prior art vehicle grill guards and none of the disadvantages.

It is another object of the present invention to provide a new and improved combination automobile grill guard and tow hitch which may be easily and efficiently manufactured and marketed.

It is further object of the present invention to provide a new and improved combination automobile grill guard and tow hitch which is of durable and reliable constructions.

An even further object of the present invention is to provide a new and improved combination automobile grill guard and tow hitch which is susceptible of a low cost of manufacture with regard to both materials and labor, and which accordingly is then susceptible of low prices of sale to the consuming public, thereby making such combination automobile grill guard and tow hitch economically available to the buying public.

Still yet another object of the present invention is to provide a new and improved combination automobile grill guard and tow hitch which provides in the apparatuses and methods of the prior art some of the advantages thereof, while simultaneously overcoming some of the disadvantages normally associated therewith.

Still another object of the present invention is to mounting the apparatus upon the front end of a vehicle for utilization as both a protective device and towing means.

Lastly, it is an object of the present invention to provide a combination automobile grill guard and tow hitch adapted to be coupled to the end of a motor vehicle, the apparatus comprising: a frame having a central segment formed as a tow hitch and two side segments, each side segment being formed in a planar generally rectangular configuration and including a generally rectangular shaped support shaft, each support shaft including a rearwardly and inwardly extending mounting bracket to permit coupling to a vehicle, each side segment including a locking device affixed thereto; and the central segment of the frame being formed as a tow hitch having a planar upper region and at least two downwardly extending legs, a lower extent of each leg being rotatably coupled to the support brackets of the frame, the upper extent of the tow hitch having a locking assembly to permit coupling with various types of hitch devices, the tow hitch being positioned in a locked vertical orientation with the apparatus being utilized as a brush guard, the tow hitch being positioned in a horizontal orientation when utilizing the apparatus as a towing device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged cross sectional view of the locking assembly of the apparatus.

FIG. 6 is an isolated prospective view of a lower region of the apparatus illustrating the spring-loaded pins and bearing members thereof.

The same reference numerals refer to the same parts through the various Figures.

DESCRIPTION OF THE PREFERRED EMBODIMENT

Figure 1:
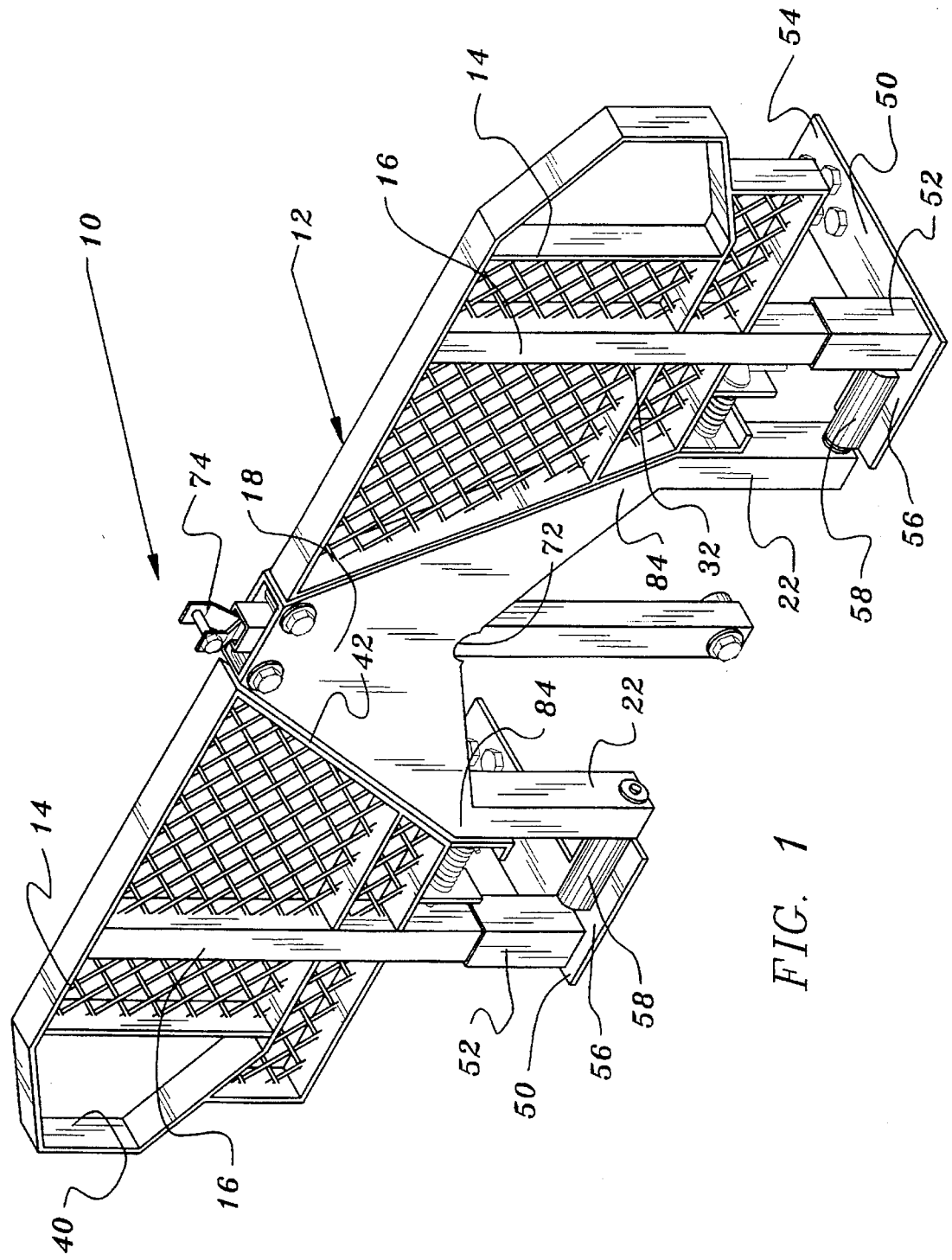
FIG. 1 is a perspective view of the preferred embodiment of the combination automobile grill guard and tow hitch constructed in accordance with the principles of the present invention.

With reference now to the drawings, and in particular to FIG. 1 thereof, the preferred embodiment of the new and improved combination automobile grill guard and tow hitch embodying the principles and concepts of the present invention and generally designated by the reference numeral 10 will be described.

The present invention, the combination automobile grill guard and tow hitch 10 is comprised of a plurality of components. Such components in their broadest context include a frame 12, two side segments 14, two support shafts 16, a central segment 18, a central draw bar 20 and two side legs 22. Such components are individually configured and correlated with respect to each other so as to attain the desired objective.

Figure 4:
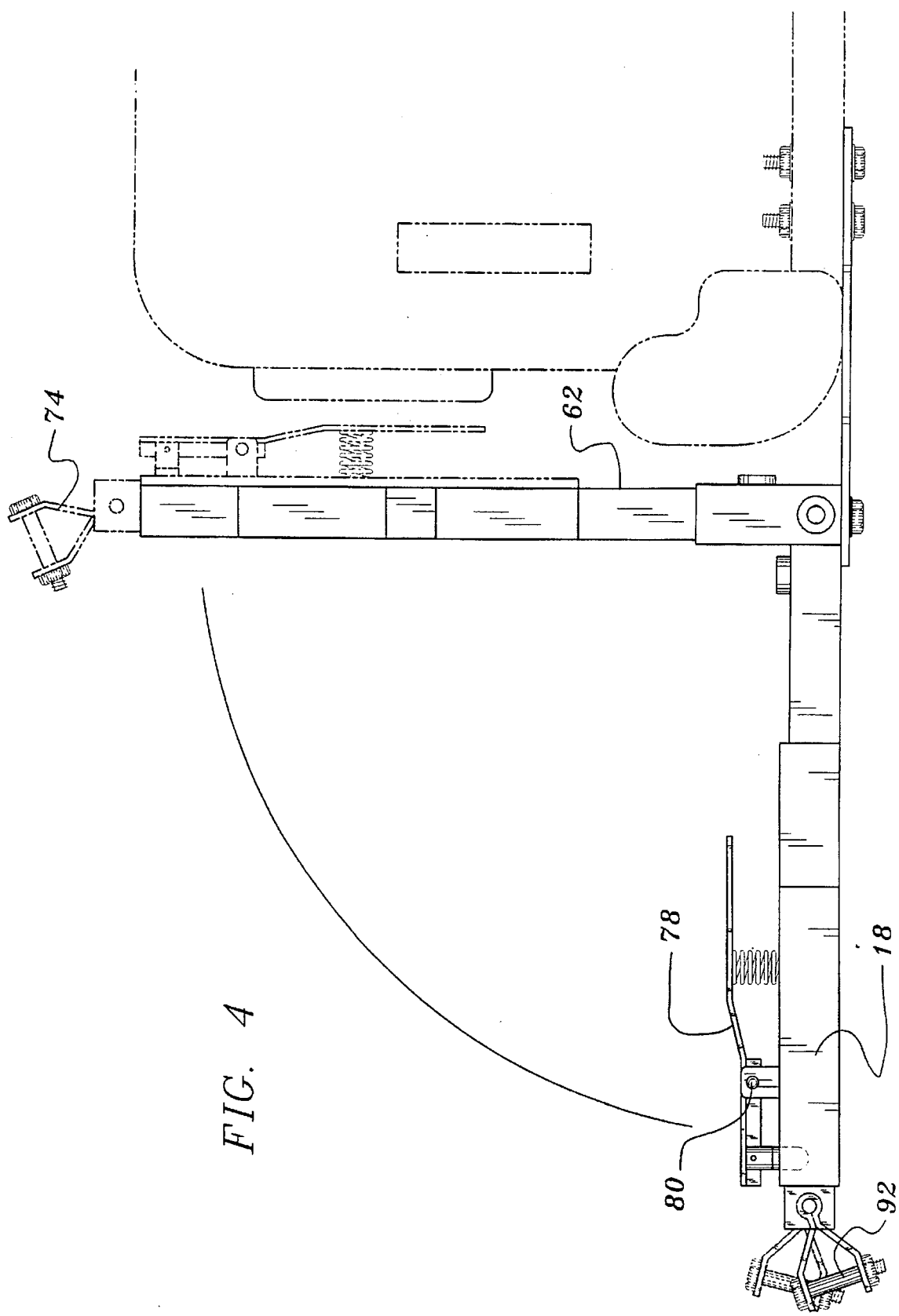
FIG. 4 is a side plan view of the apparatus in an orientation affixed to the front end of a vehicle.

The apparatus 10 is adapted to be coupled to the front end of a motor vehicle. Two mounting brackets 50 permit affixation beneath the chassis of the vehicle. In the road position the frame 12 and tow hitch are positioned in a vertical orientation in front of the grill of the vehicle. In the tow position the tow hitch is positioned in a horizontal orientation perpendicular to the frame. Note FIGS. 1 and 4.

Figure 3:
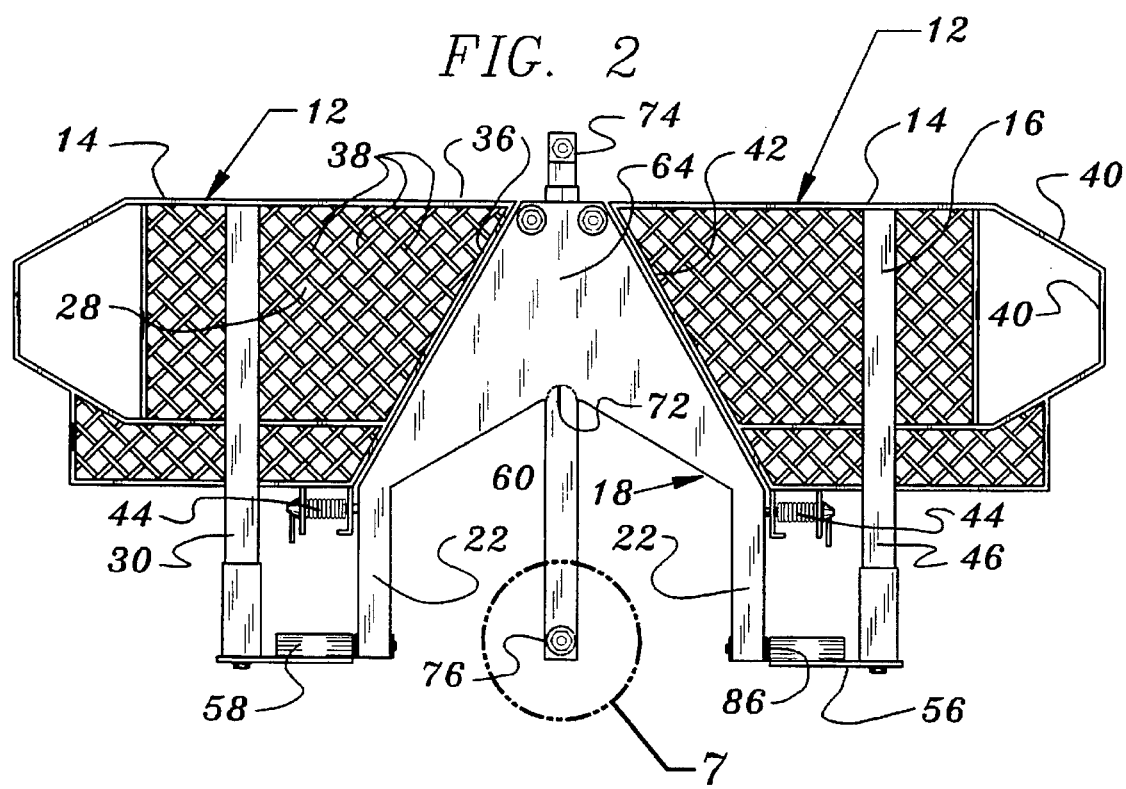
FIG. 3 is a front plan view of the apparatus shown in FIG. 1.

More specifically, the frame 12 has a central segment 18 formed as a tow hitch. The lower extent of the tow hitch is rotatably mounted to the frame. The frame includes two side segments 14 positioned adjacent to the central segment 18. All of the components of the apparatus are fabricated primarily of metal materials. Each side segment has an upper region 28, a lower region 30, a front face 32 and a rear face 34. Each side segment has a rigid periphery 36 with a mesh interior 38. In the preferred embodiment the rigid periphery is formed in a generally planar configuration and positioned parallel to the plane of the grill of the vehicle. The mesh interior is comprises a plurality of wires configured in a criss-crossed orientation. The mesh interior protects the grill of an automobile from obstructions such as brush, shrubs and other debris. The mesh also allows air flow to permit cooling of the vehicle engine and elevate air resistance. Note FIGS. 1 and 3.

Each side segment 12 has an outer end including a generally trapezoidal shaped headlight guard 40 with a hollow interior. The headlight guards are adapted to be positioned around the headlights of the subject vehicle. In alternative embodiments of the apparatus the frame and headlight guards are sized and shaped to contour to vehicles of varying makes and models. Each side segment has an inner end 42 angled outwardly from top to bottom. Each side segment includes a horizontally extending spring-loaded pin member 44. The pin members are positioned horizontally and are adapted to retain the tow hitch in a vertical orientation. The vertical orientation is called the road position since the tow hitch is positioned vertically during normal use of the vehicle. Note FIGS. 1, 3 and 6.

Each side segment 14 includes a vertically positioned support shaft 16 formed in a generally rectangular configuration. The support shafts are formed in a sturdy configuration to provide strength and stability to the apparatus. Each support shaft 16 has a lower region 46 which extends beneath each side segment 12. The lowermost extent of each support shaft is adapted to be inserted within the receiving posts of the mounting brackets. This configuration permits the user to easily remove and replace the frame from the vehicle when desired. Note FIGS. 3 and 5.

Two generally L-shaped horizontal mounting brackets 50 each include a vertical receiving post 52 with a hollow interior. The receiving posts are adapted to receive the lowermost extent of the support shafts. A heavy three quarter inch screw cap extends through the vertical receiving post and is threaded into a receiving nut welded to the bottom of the support shaft. A long portion 54 of each mounting bracket extends rearwardly and includes bolts extending through it to permit coupling beneath the chassis of a vehicle. The brackets are fabricated in a sturdy configuration to withstand the forces applied during use. A short segment 56 extends from each support shaft toward the central segment of the apparatus. Each short segment includes a generally semi-cylindrical shaped bearing member 58 affixed upon it. The lower extent of the side legs are rotatably coupled within the bearing members to permit pivotal positioning into a horizontal orientation. Note FIG. 4.

The central segment 18 of the frame is formed as a tow hitch. The tow hitch has a front face 60, a rear face 62 and an essentially hollow interior. The tow hitch has an upper region 64 formed in a planar generally triangular configuration. An upper extent of the upper region includes two opposed rotatable bearing members 68 positioned within it. The bearing members permit swivel movement of the draw bar of the apparatus. The rear surface of the tow hitch includes a centrally positioned slot with at least one circular hole 70 positioned through it. The approximate center point of the lower extent of the tow hitch includes a semicircular notch 72. The notch is adapted to permit engagement by the bolt of the second end of the draw bar. Note FIG. 3.

A central draw bar is formed in an elongated rectangular configuration and is positioned through the tow hitch between the bearing members 68. The draw bar has a first end which includes a generally U-shaped member 74 pivotally coupled to the bar by a pin. The U-shaped member is couplable to various types of hitch means. The pivotal coupling of the U-shaped member allows it to move up and down to eliminate any strain on the bar when crossing extremely uneven terrain. The U-shaped member includes a nut and bolt 92 to facilitate coupling with hitch means and other objects. The draw bar has a second end which includes a bearing 76 fastened to the bar by a bolt. In its fully extended orientation the bearing of the draw bar engages the notch of the tow hitch. When pulled forward the bar will self align centrally and automatically lock into a towing position. When not in use for towing operations the tow hitch will saddle neatly back in line with the frame forming the entire frame. Note FIGS. 3 and 4.

Figure 2:
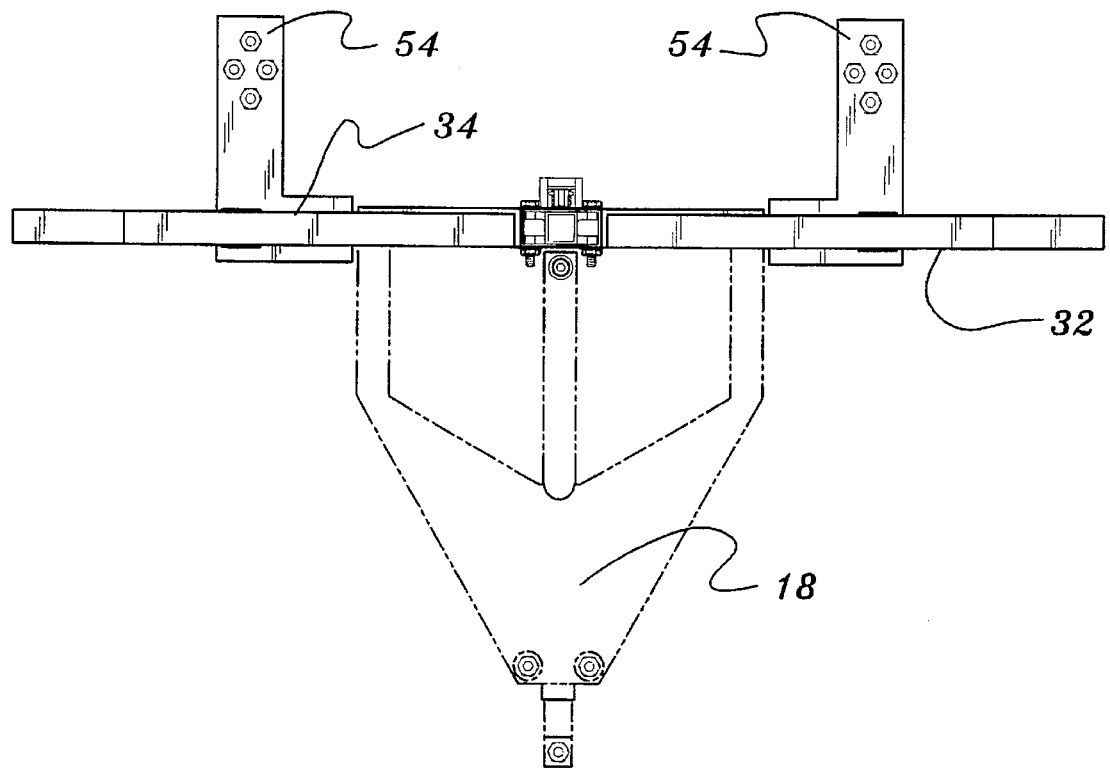
FIG. 2 is a bottom plan view of the apparatus illustrating the tow hitch assembly positioned in a horizontal orientation.

The rear surface of the tow hitch includes a bracket. A handle 78 is pivotally coupled to the bracket by a pivot pin 80. The handle has a rear section with a spring mounted thereto and is coupled to the rear surface of the tow hitch. The front end of the handle includes an engagement cylinder. In an operative orientation the tow hitch is positioned horizontally with the first end of the draw bar extending distally with respect to the frame. In a fully extending orientation the bearing of the second end engages the notch 72 of the tow hitch. In an operative orientation a user depresses the rear end of the handle, thereby compressing the spring and pivoting the engagement cylinder upward. The user may then slide the draw bar to the desired location and position the engagement cylinder through the hole in the rear surface of the tow hitch and within an aperture of the draw bar to lock the draw bar in place. Many different types of towing operations may be performed in this orientation. Note FIGS. 2 and 4.

The upper region 64 of the tow hitch has a lower extent with two end corners 84. A rectangular shaped side leg 22 extends vertically from each end corner. The lower extent of each side leg includes a sidewardly projecting rod 86 adapted to be coupled within a bearing member 58. The upper extent of each side leg including holes 88 to permit receipt of the adjacent spring-loaded pin. The tow hitch is positioned in a locked vertical orientation when the apparatus is utilized as a brush guard. In this orientation the pin members are positioned within the holes of the legs. To uncouple the tow hitch from the vertical orientation the pin members are pulled outward thereby releasing the legs. The tow hitch is then pivoted into a horizontal orientation to utilize the apparatus as a towing device. Not FIGS. 1, 4 and 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved combination automobile grill guard and tow hitch adapted to be coupled to the front end of a motor vehicle, the apparatus comprising, in combination:

a frame having a central segment formed as a tow hitch and two side segments, each side segment having an upper region, a lower region, a front face and a rear face, each side segment having a rigid periphery with a mesh interior, each side segment having an outer end including a generally trapezoidal shaped headlight guard with a hollow interior, each side segment having an inner end angled outwardly from top to bottom, each side segment including a horizontally extending spring-loaded pin member, each side segment including a vertically positioned support shaft formed in a generally rectangular configuration, each support shaft having a lower region extending beneath each side segment, two generally L-shaped horizontal mounting brackets each including a vertical receiving post with a hollow interior, each receiving post adapted to receive the lowermost extent of one of said support shafts, a ¾ inch cap screw being positioned through the receiving post, a long portion of each mounting bracket extending rearwardly and including bolts extending therethrough to permit coupling beneath the front end of a vehicle, a short segment extending from each support shaft toward the central segment of the apparatus, each short segment including a generally semi-cylindrical bearing member affixed thereupon;

the central segment of the frame being formed as a tow hitch, the tow hitch having a front face, a rear face and an essentially hollow interior, the tow hitch having an upper region formed in a planar generally tapering configuration, an upper extent of the upper region including two opposed rotatable bearing members positioned therein, the rear surface of the tow hitch including a hole positioned therethrough, the approximate center point of the lower extent of the tow hitch including a semicircular notch;

a central draw bar formed in an elongated rectangular configuration and positioned through the tow hitch between the bearing members, the draw bar having a first end including a generally U-shaped member pivotally coupled thereto by a pivot pin, the U-shaped member being couplable to various types of hitch means, the draw bar having a central extent including at least one aperture, the draw bar having a second end including a bearing fastened thereto by a bolt, the rear surface of the tow hitch including a bracket, a handle being pivotally coupled to the bracket by a pivot pin, the handle having a spring mounted thereto and coupled to the rear surface of the tow hitch, the front end of the handle including an engagement cylinder, in an operative orientation the tow hitch being positioned horizontally with the first end of the draw bar extending distally with respect to the frame, in a fully extending orientation the bearing of the second end engaging the notch of the tow hitch, in an operative orientation the engagement cylinder being positionable through the hole in the rear surface of the tow hitch and within an aperture of the draw bar to lock the draw bar in place; and the upper region of the tow hitch having a lower extent with two end corners, a rectangular shaped side leg extending vertically from each end corner, the lower extent of each side leg including a sidewardly projecting rod adapted to be coupled within a baring member, the upper extent of each side leg including a hole to permit receipt of a spring-loaded pin, the tow hitch being positioned in a locked vertical orientation with the apparatus being utilized as a brush guard, the tow hitch being pivoted into a horizontal orientation when utilizing the apparatus as a towing device.

* * * * *